(12) United States Patent
Carter et al.

(10) Patent No.: US 8,418,392 B2
(45) Date of Patent: Apr. 16, 2013

(54) COMPRESSED ELASTOMER PROCESS FOR AUTOFRETTAGE AND LINING TUBES

(75) Inventors: Robert Hansbrough Carter, Jarrettsville, MD (US); William Steinle DeRosset, Aberdeen, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 891 days.

(21) Appl. No.: 12/176,608

(22) Filed: Jul. 21, 2008

(65) Prior Publication Data
US 2009/0084255 A1    Apr. 2, 2009

Related U.S. Application Data

(60) Provisional application No. 60/955,441, filed on Aug. 13, 2007.

(51) Int. Cl.
*F41C 27/00*    (2006.01)
(52) U.S. Cl.
USPC .................. 42/76.1; 89/14.7; 72/57; 72/58
(58) Field of Classification Search .................. 89/14.7; 72/54–63; 29/446, 449, 458, 527.1, 527.2
See application file for complete search history.

(56) References Cited

U.S. PATENT DOCUMENTS

| | | | |
|---|---|---|---|
| 1,329,762 A | 2/1920 | Guy | |
| 1,391,009 A | 9/1921 | Schneider | |
| 1,495,587 A | 5/1924 | Grimm | |
| 1,602,282 A * | 10/1926 | Methlin | 89/14.7 |
| 3,411,198 A | 11/1968 | Berman et al. | |
| 3,710,434 A | 1/1973 | Daniels et al. | |
| 3,722,245 A * | 3/1973 | Yamamoto et al. | 72/60 |
| 4,417,459 A * | 11/1983 | Tomita | 72/56 |
| 4,571,969 A * | 2/1986 | Tomita | 72/56 |
| 4,635,840 A | 1/1987 | Cenanovic | |
| 4,729,806 A * | 3/1988 | Stein | 156/172 |
| 5,160,802 A * | 11/1992 | Moscrip | 89/16 |
| 5,837,921 A * | 11/1998 | Rinaldi et al. | 89/14.1 |
| 6,491,182 B1 | 12/2002 | Holroyd | |
| 6,810,615 B2 | 11/2004 | Hermanson et al. | |
| 6,883,197 B2 * | 4/2005 | Tak | 12/115.8 |
| 7,036,346 B2 | 5/2006 | Burger | |
| 7,818,986 B1 * | 10/2010 | Parker et al. | 72/58 |
| 2002/0029449 A1 | 3/2002 | Portmann | |
| 2004/0103576 A1 | 6/2004 | Wagner et al. | |
| 2004/0107754 A1 * | 6/2004 | Frenken | 72/62 |
| 2004/0148839 A1 * | 8/2004 | Hermanson et al. | 42/76.1 |
| 2005/0066801 A1 * | 3/2005 | Hermanson et al. | 89/14.1 |
| 2008/0000065 A1 | 1/2008 | Ganguly et al. | |

* cited by examiner

*Primary Examiner* — Samir Abdosh
(74) *Attorney, Agent, or Firm* — Christos S. Kyriakou

(57) ABSTRACT

An inventive process is provided for creating residual compressive stress at a surface of a structure without resort to custom mandrels and dangerous high-pressure fluids. The inventive process yields autofrettage of a structure such as a tube, gun barrel and the like, the structure having an outer surface and an inner surface.

26 Claims, 1 Drawing Sheet

US 8,418,392 B2

COMPRESSED ELASTOMER PROCESS FOR AUTOFRETTAGE AND LINING TUBES

CROSS REFERENCE TO RELATED APPLICATIONS

This application claims the benefit of U.S. provisional application Ser. No. 60/955,441 filed Aug. 13, 2007, the entire contents of which are incorporated herein by reference.

GOVERNMENT INTEREST

The invention described herein may be manufactured, used, and licensed by or for the United States Government.

FIELD OF THE INVENTION

The present invention relates in general to a process for autofrettaging a structure, and in particular, to a process for autofrettaging a structure, for example as a gun barrel, using an expander.

BACKGROUND OF THE INVENTION

It is well known that a residual compressive stress at a component surface can increase the strength and fatigue life of the component. For example, residual compressive stresses imposed on inner surfaces of tubes can provide resistance to fatigue and inhibit crack initiation and the rate of crack propagation. Such results are possible since the propagation of a crack requires tensile stresses to be present at the tip of the crack, and if a surface is under compression, the compressive stress must be overcome—in addition to any tensile stresses required for crack initiation and/or crack propagation—before the crack can be created or propagate if already present.

One process to produce residual compressive stress to a surface is called autofrettage. Autofrettage is a process wherein pressure is applied within a containers e.g. a tube, such that the outer surface of the container undergoes elastic deformation whereas the inner surface undergoes elastic plus plastic deformation. After the pressure is removed, the outer surface recovers the elastic strain but the inner surface recovers only the elastic strain with the plastic strain resulting in a residual compressive stress being present.

Autofrettage plastic deformation to the interior of a tube can be created in a number of ways, including the use of explosives, hydraulic pressure, or mechanical force. For example, mechanical autofrettage uses a press to force an oversized mandrel through a tube, thereby causing the inner surface of the tube to yield in tension while the material at the outer surface of the tube remains elastic. After the mandrel has passed through the tube, relaxation of the material results in a distribution of residual stress that is compressive on the inner surface.

In addition to mechanical autofrettage, hydraulic autofrettage can be accomplished by placing a fluid within a sealed container and applying pressure. Looking at FIGS. 1-3, a pump 20 can apply pressure to a hydraulic liquid 40 within a tube 10. The tube 10 has an outer surface 12 and an inner surface 14. Also included are high-pressure seals 30 which prevent the liquid 40 under high pressure from escaping the tube 10. An internal pressure $p_i$ within the interior of the tube 10 can cause elastic strain $\epsilon_{od}$ on the outer surface 12 and elastic plus plastic strain $\epsilon_{id}$ on the inner surface 14 as illustrated in FIG. 2. After the pressure is removed, the elastic strain is recovered at the outer surface 12 and inner surface 14, however the plastic strain at the inner surface 14 results in the presence of a residual compressive stress $\sigma_{id}$. In this manner, a tube 10 having residual compressive stress at the inner surface 14 is provided.

Although such processes have been used to produce autofrettage within tubes such as gun barrels, processing equipment, high-pressure pump cylinders, and the like, the mechanical autofrettage process requires the manufacture of mandrels that are specially designed and dimensioned for the particular tube, gun barrel, etc. In addition, the use of hydraulic autofrettage requires the use of high-pressure seals to be attached to the tube, gun barrel, etc., and with equipment failure can result in the rapid and/or uncontrolled release of high-pressure fluid. Such a release is dangerous and requires additional safety equipment to be used with hydraulic autofrettage systems. Therefore, an improved process that provides for autofrettage would be desirable.

SUMMARY OF THE INVENTION

An inventive process is provided for creating residual compressive stress at a surface of a structure without resort to custom mandrels and dangerous high-pressure fluids. The inventive process yields autofrettage of a structure such as a tube, gun barrel and so forth, the structure having an outer surface and an inner surface. Exemplary structures that may be autofrettaged using processes of the present invention include, but are not limited to: gun barrels, pipes, tubes and other tubular articles for example a ¾ pipe, tanks, pressure vessels, containers and so forth. In addition, the process provides an expander that is placed adjacent the inner surface of the structure and a compressive force is applied thereto. In desirable embodiments, the compressive force is an axial force. The compressive force along the axial direction of the expander causes it to expand in a radial direction as it is compressed in the axial direction. The expansion of the expander in the radial direction results in pressure being exerted on the interior surface of the structure and autofrettage thereof. In some instances, the expander is made from an elastomer. In addition, the amount of autofrettage induced on the inner surface along a length of the structure can be varied and thereby provide a graded autofrettaged structure.

The inventive process can also include providing a liner intermediate between the expander and the structure. Thereafter, with application of axial compressive force to the expander, an outer surface of the liner is bonded to the inner surface of the structure and/or inducement of autofrettage of the liner is provided.

DETAILED DESCRIPTION OF THE PREFERRED EMBODIMENTS

The present invention discloses an inventive process for autofrettaging structures. As such, the process has utility for providing such structures with increased fatigue resistance.

The inventive process includes providing a structure that has an outer surface and an inner surface. An expander is placed adjacent to the inner surface of the structure and an axial compressive force is applied thereto. Preferably, the expander is made from an elastomer or a plastic having a Poisson's ratio between 0.3 and 0.5 inclusive and, more preferably, an elastomer or a plastic having a Poisson's ratio between 0.4 and 0.5 inclusive. The expander can be a solid form such as a plug, a particulate such as granules or shredded material, or a combination of both.

With the compressive force applied along the axial direction of the expander, it expands in a radial direction and thereby provides a pressure to the inner surface of the structure. It is appreciated that the structure can be a hollow cylindrically shaped structure such as a tube, gun barrel, high-pressure pump cylinder, and the like.

The axial compressive force applied to the expander is of sufficient magnitude to cause radial expansion of the expander and result in predominantly elastic strain to the outer surface and elastic plus plastic strain to the inner surface of the structure. It is appreciated that the elastic and plastic strains can be radial and/or radial plus axial in nature. In this manner, when the axial compressive force is removed from the expander, the elastic strain is recovered at the outer surface of the structure, however the plastic strain at the inner surface results in a compressive residual stress thereon. Preferably axially compressive force is applied to one end of the expander, however this is not required. In addition, it is appreciated that an expander can take a number of shapes, illustratively including shapes for use in autofrettaging cylindrically-shaped components, conically-shaped components, spherically-shaped components and the like.

Optionally, a liner is placed intermediate between the expander and the inner surface of the structure. Thereafter, axial compressive force is applied to the expander, thereby resulting in an outwardly directed pressure being applied to the liner. This outward pressure can result in the bonding of an outer surface of the liner to the inner surface of the structure and/or plastic deformation to the liner. For the purposes of the present invention, the term bonding includes frictional bonding between two surfaces, mechanical interlocking between two surfaces and combinations thereof. In this manner, bonding of the liner to the structure and/or autofrettage of the liner are accomplished.

Figure 1:
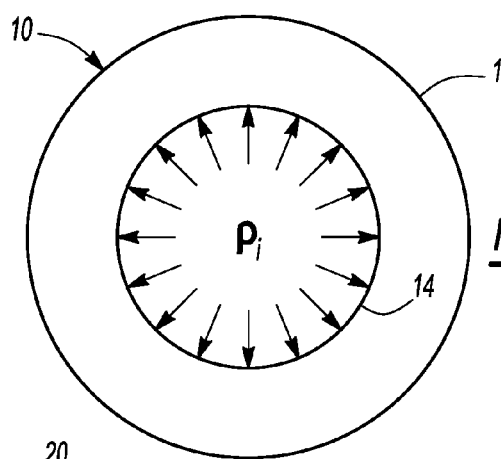
FIG. 1 is a schematic illustration of an internal pressure within a structure.
Figure 2:
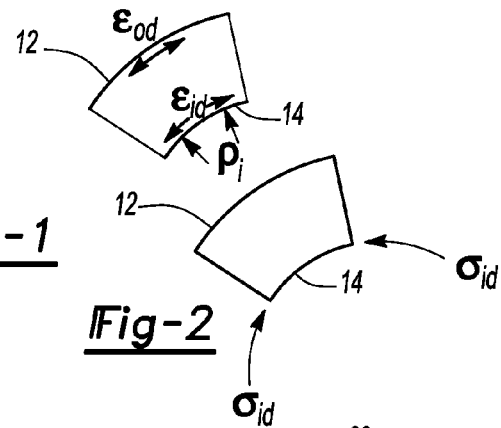
FIG. 2 is a schematic illustration of strain and stress present at an outer surface and an inner surface of the structure shown in FIG. 1.
Figure 3:
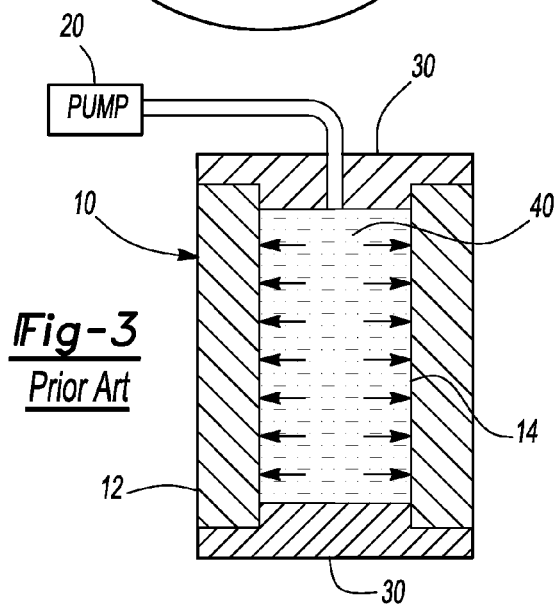
FIG. 3 is a schematic illustration of a prior art process for the autofrettaging of the structure shown in FIG. 1.
Figure 4:
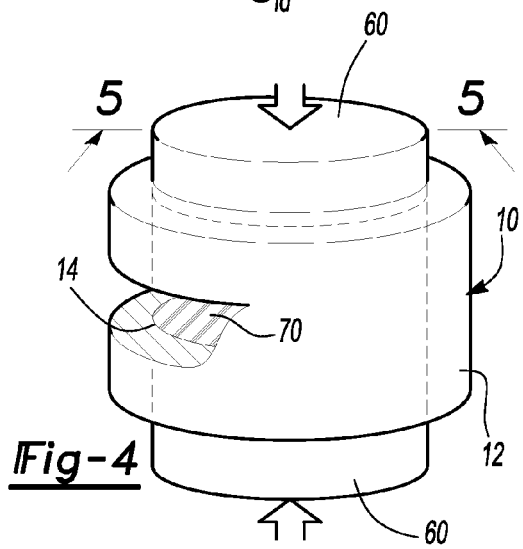
FIG. 4 is a perspective view of an embodiment of the present invention.
Figure 5:
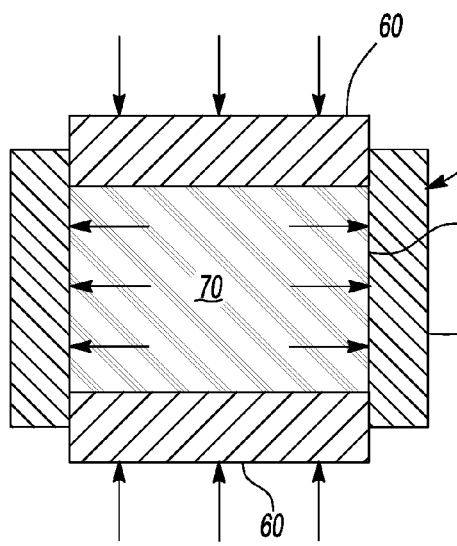
FIG. 5 is a side cross-sectional view of the embodiment shown in FIG. 4.

Turning now to FIGS. 4 and 5, an embodiment of the process disclosed herein is illustrated. As shown in FIG. 4, a structure in the form of a tube 10 having an outer surface 12 and an inner surface 14 is provided. Within the tube 10 is an expander 70 with end caps 60 at opposite axial ends of the expander 70. As illustrated by the arrows in FIG. 4, an axial compressive force is applied to the end caps 60 and thereby transmitted to the expander 70. In certain preferred embodiments, the expander 70 is be made from an elastomer and/or a plastic so that the expander 70 has a Poisson's ratio between about 0.3 and about 0.5, inclusive. In certain more preferred embodiments, the expander 70 is be made from an elastomer and/or a plastic so that the expander 70 has a Poisson's ratio between about 0.4 and about 0.5, inclusive.

Looking specifically at FIG. 5, as the axial compressive force is applied to the expander 70, a radial force is applied to the inner surface 14 of the tube 10 as illustrated by the horizontal arrows. The radial force predominantly induces elastic strain at the outer surface 12, whereas elastic plus plastic strain is produced at the inner surface 14. Thereafter, the axial compressive force is removed, along with the end caps 60 and the expander 70, with the tube 10 having a residual compressive stress at the inner surface 14 having been produced.

The length of the tube 10 can be varied and components such as gun barrels, processing tubing equipment, high-pressure pump cylinders and the like, or in the alternative, conically-shaped components, hemispherically-shaped components, spherically-shaped components, and the like can be autofrettaged using the inventive process disclosed herein.

In some instances, the end caps 60 can also undergo radial expansion and thereby not allow extrusion of the expander 70 between the end caps 60 and the inner surface 14 of the tube 10. In this manner, the tolerance between an outer diameter of the end caps 60 and an inner diameter of the tube 10 does not have to be as stringent as with previous processes of autofrettaging. As such, it is appreciated that the use of the expander 70 results in high-pressure seals not being required.

Figure 6:
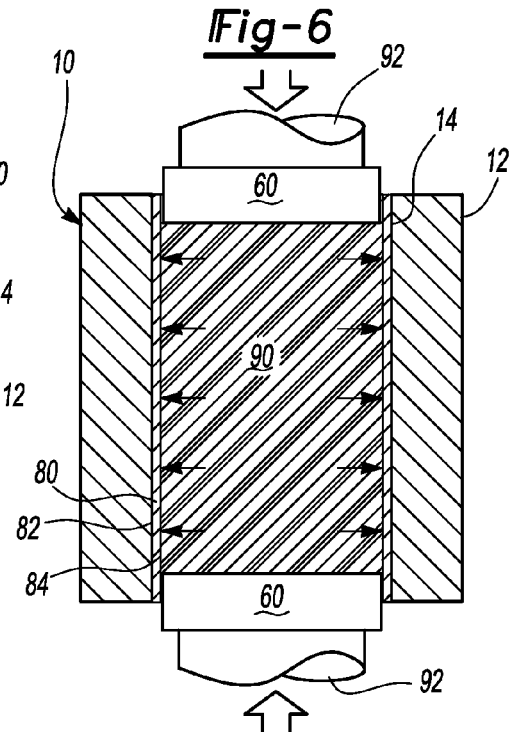
FIG. 6 is a side cross-sectional view of a different embodiment of the present invention.

Turning now to FIG. 6, where like numerals correspond to those used with respect to the aforementioned figures, the tube 10 has a liner 80 placed therein. The liner 80 has an outer surface 82 and an inner surface 84. Within the liner 80, is placed an expander 90. As illustrated by the broad vertical arrows in FIG. 6, an axial compressive force is applied to the expander 90 through the use of hydraulic cylinders 92 and end caps 60.

The horizontal arrows in FIG. 6 illustrate that the application of the axial compressive force results in radial expansion of the expander 90. The radial expansion provides an internal pressure applied to the liner 80. In some instances, the internal pressure is sufficient to bond the outer surface 82 of the liner 80 to the inner surface 14 of the tube 10 or produce autofrettage of the liner 80. Optionally, pressures are applied to simultaneously bond the liner 80 to the tube 10 and produce autofrettage of the liner 80. In addition to bonding of the liner 80 to the tube 10, plastic strain can be produced at least partially within the wall thickness of the liner 80 and thereby result in residual compressive stresses being present within the liner 80 after the axial compressive force has been removed. In this manner, the liner 80 is bonded to the tube 10 and the liner is optimally autofrettaged in one processing step.

The structure and the liner are made from any material known to those skilled in the art illustratively including metals and alloys. In some instances, the structure is made from a steel, stainless steel, nickel-based alloy, cobalt-based alloy, and the like. In addition, the liner can be made from low strain-to-failure materials such as intermetallics, niobium, tungsten, molybdenum, alloys thereof and the like. In this manner, a liner having relatively high hardness can be placed and bonded within a structure such as a gun barrel. The expander can be made from any material known to those skilled in the art and is preferably made from a material that has a Poisson's ratio is between 0.3 and 0.5, inclusive. For example, rubber has a Poisson's ratio generally equal to 0.5 and can be used as the expander material.

It is appreciated that the process can be used to apply different magnitudes of residual compressive stress as a function of location within a structure. For example, using an expander of significant less length than a tube, the expander can be placed at different locations along the length of the tube with the magnitude of axial compressive force applied to the expander being a function the expander location. In the alternative, an expander having a property such as an outer diameter, physical form (e.g. solid form versus particulate) and/or composition that varies as a function of an axial length of the expander, can be placed within the tube and axial compressive force applied thereon. Thus a different internal pressure is applied to the inner surface of the tube, or a liner placed within the tube, as a function of location. In this manner, a gradient of residual compressive stresses can be imposed along the length of the tube.

Due to friction between the expander and the tube or liner, there is a pressure gradient along the length of the tube or liner when a load is applied to the expander. The highest pressure will be near the point where the load is applied, and the lowest pressure will be at a point farthest from where the load is applied. This friction can be reduced by the use of a lubricant between the expander and the inner surface of the tube. The lubricant can be any material known by those skilled in the art to reduce the friction between the surfaces. Suggested lubricants include, but are not limited to, erucic acid, graphite, oil, and so forth. If a lubricant is not used, the pressure gradient will result in a variation in autofrettage, with the greater degree of autofrettage occurring where the pressure is the highest. The bond strength between the liner and tube will also vary with the pressure. Thus in certain desirable embodiments, a method of the present invention further includes providing a lubricant between the expander and the inner surface of the structure.

The state of residual stress will vary along the axial length of the tubes since the pressure is only generated where the expander is in contact with the tube wall. The ends of the tube that have no contact with the expander will have little to no bond between the structure and liner, and will not possess a state of autofrettage. If it is desired to have the length of the tube to possess a bond or a state of autofrettage, the tubes can be made with excess length that can be removed. An alternative approach includes making a liner with excessive length and further including an auxiliary structure that supports the ends of the liner. After the process is completed, the auxiliary structure is removed, and the ends of the liner are cut off.

The foregoing description is illustrative of particular embodiment of the invention, but is not meant to be a limitation upon the practice thereof. The following claims, including all equivalents thereof are intended to define the scope of the invention.

We claim:

1. A process for autofrettaging wherein the process comprises imposing plastic deformation on an inner surface of a metal structure and elastic deformation on a more outer portion of the structure, the process comprising:
   providing a metal structure having an outer surface and an inner surface;
   providing an expander that comprises an elastomer or a plastic;
   placing a liner intermediate between the expander and the metal structure having an outer surface and an inner surface, said liner having an outer surface and an inner surface;
   placing the expander adjacent the inner surface of the liner; and
   applying a compressive force onto the expander
   wherein the elastomeric or plastic expander occupies a majority of the volume of the metal structure and has a Poisson's ratio between 0.4 and 0.5.

2. The process of claim 1, wherein the metal structure having an outer surface and an inner surface is a hollow cylindrically shaped structure.

3. The process of claim 2, wherein the hollow cylindrically shaped structure is made from a made from a steel alloy, a stainless steel alloy, a nickel-based alloy or a cobalt-based alloy.

4. The process of claim 3, wherein the hollow cylindrically shaped structure is a gun barrel.

5. The process of claim 1, wherein the compressive force is an axial force.

6. A structure produced by the process of claim 1.

7. The process of claim 1, wherein the expander has a form selected from the group consisting of a solid form, a particulate and combinations thereof.

8. A process for autofrettaging wherein the process comprises imposing plastic deformation on an inner surface of a structure and elastic deformation on a more outer portion of the structure, the process comprising:
   providing a structure having an outer surface and an inner surface;
   providing an elastomeric or plastic expander that occupies a majority of the interior volume of the structure;
   placing the expander adjacent the inner surface of the structure; and
   applying a compressive force onto the expander
   wherein the compressive force induces predominantly elastic strain to the outer surface of the structure and elastic plus plastic strain to the inner surface of the structure
   further wherein the compressive force induces predominantly elastic strain to the outer surface of the structure and elastic plus plastic strain to the inner surface of the structure.

9. A structure produced by the process of claim 8.

10. A process for autofrettaging wherein the process comprises imposing plastic deformation on an inner surface of a structure and elastic deformation on a more outer portion of the structure, the process comprising:
    providing a structure having an outer surface and an inner surface;
    providing an elastomeric or plastic expander that occupies a majority of the interior volume of the structure;
    placing the expander adjacent the inner surface of the structure; and
    applying a compressive force onto the expander
    wherein the compressive force induces predominantly elastic strain to the outer surface of the structure and elastic plus plastic strain to the inner surface of the structure
    further wherein the expander has a property that varies along an axial length of the expander, the property selected from the group
    consisting of outer diameter, physical form, composition and combinations thereof, for the purpose of providing a gradient of autofrettaging along a length of the structure.

11. A process for autofrettaging wherein the process comprises imposing plastic deformation on an inner surface of a structure and elastic deformation on a more outer portion of the structure, the process comprising:
    providing a structure having an outer surface and an inner surface;
    providing an expander that occupies a majority of the interior volume of the structure;
    placing the expander adjacent the inner surface of the structure; and
    applying a compressive force onto the expander
    wherein the compressive force induces predominantly elastic strain to the outer surface of the structure and elastic plus plastic strain to the inner surface of the structure
    further comprising placing a liner intermediate between the expander and the structure.

12. The process of claim 11, wherein the compressive force induces predominantly elastic strain to the outer surface of the structure and elastic plus plastic deformation to the liner within the structure.

13. The process of claim 11, wherein the compressive force causes bonding between the outer surface of the liner and the inner surface of the structure.

14. A process for autofrettaging wherein the process comprises imposing plastic strain on an inner surface of a hollow cylindrically shaped structure and elastic deformation on a more outer portion of the structure, the process comprising:
   providing a hollow cylindrically shaped structure having an outer surface and an inner surface;
   providing an elastomer expander, the elastomer expander dimensioned and shaped to be inserted within the hollow cylindrically shaped structure and occupy a majority of the volume of the hollow cylindrically shaped structure;
   inserting the elastomer expander within the hollow cylindrically shaped structure; and
   applying an axial compressive force onto opposite ends of the elastomer expander, the axial compressive force inducing predominantly elastic strain on the outer surface of the hollow cylindrically shaped structure and elastic plus plastic strain on the inner surface of the hollow cylindrically shaped structure.

15. The process of claim 14, wherein the elastomer expander has a Poisson's ratio between 0.3 and 0.5.

16. The process of claim 14, wherein the hollow cylindrically shaped structure is a gun barrel.

17. The process of claim 14, wherein a magnitude of the axial compressive force is a function of where the elastomer expander is located within the hollow cylindrically shaped structure, for the purpose of providing a gradient of autofrettaging along a length of the hollow cylindrically shaped structure.

18. The process of claim 14, wherein the elastomer expander has a property that varies along an axial length of the elastomer expander, the property selected from the group consisting of outer diameter, physical form, composition and combinations thereof, for the purpose of providing a gradient of autofrettaging along a length of the hollow cylindrically shaped structure.

19. The process of claim 14, further comprising placing a liner intermediate between the expander and the hollow cylindrically shaped structure.

20. The process of claim 19, wherein the axial compressive force induces predominantly elastic strain to the outer surface of the hollow cylindrically shaped structure and elastic plus plastic strain to the liner within the hollow cylindrically shaped structure.

21. A process for imposing plastic deformation on an inner surface of a metal structure, the process comprising:
   providing a metal structure having an outer surface and an inner surface;
   providing an expander;
   placing the expander adjacent the inner surface of the metal structure; and
   applying a compressive force onto the expander
   wherein a magnitude of the compressive force is a function of where the expander is.

22. The process of claim 21, wherein the expander comprises a material that has a form selected from the group consisting of a solid form, a particulate and combinations thereof.

23. The process of claim 22, wherein the expander comprises a material that is a solid elastomer or a solid plastic.

24. The process of claim 22, wherein the expander comprises elastomeric particles or plastic particles or a combination thereof.

25. The process of claim 22, wherein comprises a material that has a Poisson's ratio between 0.4 and 0.5.

26. The process of claim 22, further comprising placing a liner intermediate between the expander and the hollow cylindrically shaped structure.

\* \* \* \* \*